(12) United States Patent
Creasap et al.

(10) Patent No.: US 9,415,554 B2
(45) Date of Patent: *Aug. 16, 2016

(54) METHOD OF CONTROLLING PRODUCT VOLUME IN A FIXED VOLUME MOLD

(71) Applicants: Compagnie Generale des Etablissements Michelin, Clermont-Ferrand (FR); Michelin Recherche et Technique S.A., Granges-Paccot (CH)

(72) Inventors: Mark Creasap, Spartanburg, SC (US); Brian Wilson, Greer, SC (US); Robert Gaut, Easley, SC (US); James Endicott, Greenville, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/815,317
(22) Filed: Jul. 31, 2015

(65) Prior Publication Data

US 2015/0336341 A1    Nov. 26, 2015

Related U.S. Application Data

(63) Continuation of application No. 13/510,713, filed as application No. PCT/US2013/075624 on Dec. 17, 2013, now Pat. No. 9,144,946.

(60) Provisional application No. 61/738,658, filed on Dec. 18, 2012.

(51) Int. Cl.
  *B29C 31/00* (2006.01)
  *B29D 30/06* (2006.01)
  (Continued)

(52) U.S. Cl.
  CPC ........ *B29D 30/0601* (2013.01); *B29D 30/0662* (2013.01); *B29D 30/30* (2013.01); *B29D 30/3007* (2013.01); *B29D 30/58* (2013.01); *B29D 2030/523* (2013.01)

(58) Field of Classification Search
  CPC .......... B29D 30/0603; B29D 30/0662; B29D 30/20; B29D 30/30; B29C 41/52; B29C 43/58
  USPC ............. 264/40.4, 326, 39, 501, 502; 425/29, 425/140
  See application file for complete search history.

(56) References Cited

U.S. PATENT DOCUMENTS

| 4,101,463 A * | 7/1978 | Morgan .................. C08J 11/06 521/42 |
| 5,453,228 A * | 9/1995 | Bellettato ............... B29C 31/06 264/145 |

(Continued)

FOREIGN PATENT DOCUMENTS

| DE | 102005021979 A1 | 11/2006 |
| EP | 1514675 A2 | 3/2005 |
| JP | 2005053084 A | 3/2005 |

OTHER PUBLICATIONS

International Search Report and Written Opinion, dated Feb. 1, 2010.

*Primary Examiner* — Timothy Kennedy
(74) *Attorney, Agent, or Firm* — John Steckler Schwab (57) ABSTRACT

A method for precisely controlling the volume of a product such as a tire tread or tire that is placed into a mold is provided. This method includes providing a tread or tire that is built upon a portable mold core by laying a series of layers on the portable mold core. The outer diameter of the tire tread or tire is initially built to be purposely smaller than the interior surfaces of the mold in order to prevent any interference from occurring between the mold and the tire tread once the tire tread and core are placed within the mold and the mold is closed. The weight of the tire tread or tire is measured to see if the volume of the tire tread or tire is within acceptable parameters to fit within the mold. If not, additional material is added to the tire or tire tread.

13 Claims, 6 Drawing Sheets

(51) Int. Cl.
   *B29D 30/30*   (2006.01)
   *B29D 30/58*   (2006.01)
   *B29D 30/52*   (2006.01)

(56) References Cited

U.S. PATENT DOCUMENTS

| | | | |
|---|---|---|---|
| 5,723,154 A * | 3/1998 | Irie | B29C 31/006 425/186 |
| 6,619,088 B1 * | 9/2003 | Oyamada | B30B 1/186 72/17.2 |
| 6,769,465 B2 | 8/2004 | Rhyne et al. | |
| 7,013,939 B2 | 3/2006 | Rhyne et al. | |
| 7,201,194 B2 | 4/2007 | Rhyne et al. | |
| 2005/0051256 A1 | 3/2005 | Benzing et al. | |
| 2007/0125497 A1 * | 6/2007 | Lundell | B29D 30/0601 156/414 |
| 2008/0110547 A1 * | 5/2008 | Yovichin | B29C 47/0021 156/64 |
| 2008/0116763 A1 * | 5/2008 | Goldman | H02N 2/18 310/319 |
| 2008/0156407 A1 | 7/2008 | Sakamoto et al. | |
| 2008/0251185 A1 | 10/2008 | Cappa et al. | |
| 2010/0212811 A1 | 8/2010 | Seitz | |

* cited by examiner

METHOD OF CONTROLLING PRODUCT VOLUME IN A FIXED VOLUME MOLD

This application is a continuation of application Ser. No. 13/510,713, filed May 18, 2012, which was a nationalization of PCT Application No. PCT/US2009/066039, filed Nov. 30, 2009, each which are hereby incorporated by reference in their entirety.

BACKGROUND OF THE INVENTION

1. Field of the Invention

This invention relates generally to a method of manufacturing tires that are cured in a mold, and, more specifically, to a method for fabricating a tire or tire tread around a portable mold core, both of which are moved through various tire building stages until the tire or tire tread and core are placed into a mold where the rubber materials of the tire are cured.

2. Description of the Related Art

It is commonly known that tires are made by wrapping a number of tire products including carcass plies, belts and tread rubber sequentially about a building drum or other apparatus that provides a building surface. Many of these products include a rubber or some other thermoset elastomer in them that is in the "green" or uncured state during the tire building process. It is desirable that these materials be cured after the tire has been built so that their molecules cross link, which imparts them with greater durability which is particularly advantageous in promoting the endurance and life of the tire in use. In order to accomplish this, the green tire is typically placed into a mold where sufficient heat and pressure are added to the rubber and elastomer materials so that curing or vulcanization occurs, creating the cross linked molecules that provide the aforementioned desirable characteristics.

Pneumatic tires also have sidewalls that terminate in bead sections, all of which are built onto the building drum, and that provide the means by which the tire is held onto the rim of a vehicle. This type of tire is often cured in a mold whose surfaces that form the outer portions of the tire, including the width of the tire and its outer circumference, which are spatially fixed and that also has an inflatable bladder that mates with the inner surfaces of the tire. As can be imagined, the volume of tires placed into such a mold varies as a result of the tire building process as the tire products are laid onto the building drum. This is attributed to slight mass variations within the products that make up the tire as well as the imprecision with which these products are placed on top of each other. Also, there are usually tiny air pockets that have been trapped during the fabrication of the tire as one layer is laid upon another. Once a green tire is placed into the mold, the inflatable bladder is expanded with enough pressure so that any gaps between the fixed surfaces of the mold and the outer surfaces of the tire as well as any air pockets within the tire itself are removed, helping to ensure that heat and pressure can be effectively transferred to the rubber materials for proper vulcanization. The typical industry practice results in a situation where an uncured tire is often smaller than the volume of the closed mold and that this design criteria accounts for any customary building product volume variation. When the uncured tire is smaller than the closed mold volume, the mold can be closed via conventional tire curing press technology. The inflation bladder expansion accommodates any normal volume variations that occur from uncured tire to uncured tire during production. Further, should conditions result in uncured tires that are oversized as compared to the volume of the mold, the pressure within the inflatable bladder, and its flexibility, allow the mold to close properly, without damage to the mold itself or the surrounding mechanisms. Once the mold is fully closed and locked, the inflatable bladder is then expanded so that proper conduction of heat and pressure from the mold to the tire can be achieved as previously described.

However, such molding technology does not work effectively with all types of tires. For example, some non-pneumatic tires have a shear band in their tread that comprises inextensible membranes that surround a shear layer made of an elastomer material. For an example of this construction, see U.S. Pat. Nos. 6,769,465; 7,013,939 and 7,201,194 that are commonly owned by the assignee of the present application. The membranes are very stiff, i.e. 100 to 1000 times more stiff than rubber, as they often use reinforcements made of uninterrupted steel cord. Further, the orientation of the reinforcements within the membranes is generally circumferential. The combined result of reinforcement and orientation is the inextensible nature of these membranes. This is different from typical pneumatic tire industry practice, where the steel cords are angled with respect to the circumference of the tire belts. The presence of this cord angle introduces interruptions of the cord along the circumferential direction of the belts. These interruptions of the steel cords, along with the low stiffness circumferential reinforcements that are also in typical use by the tire industry, result in uncured pneumatic tires that are extensible in circumference and therefore are compatible with inflatable bladder molding technology.

When inflatable bladders are used with tire constructions that include inextensible membranes, one of two adverse reactions generally occur. When there is insufficient uncured tire volume, the inflatable bladder will force an undesirable flow of rubber between the steel cords, which degrades the mechanical performance of the cured tire. Conversely, when there is excess uncured tire volume, the closing mold will distort the belts as the tire is forced to have a smaller circumference. The inextensible belts must buckle, since they cannot change circumference. The inflatable bladders, lacking any mechanism to constrain distortion, simply accommodate the buckling and thus allow the distortion to become a permanent feature of the cured tire.

Accordingly, it is desirable to find a method for controlling the volume of the tire tread or tire precisely so that it can fit snugly within a mold without damaging the tire tread or tire, or other components thereof, upon mold closing and so that the tread or tire expands sufficiently as the mold heats up so that it contacts the mold without causing the flow of rubber between the steel cords of an inextensible membrane, helping to ensure that enough pressure and heat are transferred to the elastomer materials in the tread or tire for proper vulcanization and the removal of any air pockets found within the tread or tire.

SUMMARY OF THE INVENTION

Particular embodiments of the present include a method for controlling the volume of a product that is placed in a mold comprising the following steps. A mold and portable mold core are provided. One or more layers of products are laid onto the portable mold core to form a tire or tire tread. The tire or tire tread is weighed. If the weight of the tire or tire tread is within acceptable parameters, the tire or tire tread and the portable mold core are placed into a mold.

In certain cases, the method further comprises the step of adding material to the tire or tire tread if after weighing the tire or tire tread the weight of the tire or tire tread as calculated is not within acceptable parameters. This step of adding material to the tire or tire tread may include adding a strip of material to the outer circumference of the tire or tire tread that is spaced approximately 75 millimeters away from a side surface of the tire or tire tread. In still other cases, the step of adding material also includes adding a second strip of material to the outer circumference of the tire or tire tread that is spaced 75 millimeters away from the other side surface of the tread or tire. The first and second strips of material may be made from a material that is compatible with the top layer of the tire tread and may have the same dimensions as each other. In such a situation, the thickness and width of the strips of material are approximately 2 millimeters and 30-40 millimeters respectively. Also, the strips of material may be wound completely around the circumference of the tire tread. In some cases, one or more strips of rubber are stretched as they are applied to the tread or tire to adjust the amount of weight that is added to the tire or tread.

In other embodiments, the method may further comprise the step of reweighing the tire or tire tread and determining whether the weight or volume of the tire or tire tread is within acceptable parameters. In some cases, the targeted mass that is equivalent to an acceptable volume for the tire tread or tire ranges from approximately 58.3 to 59.4 Kg. The initial tire tread or tire may be built to be less than targeted mass and volume and may be within 99.1 and 100% of the targeted mass and volume for the tire tread or tire.

Sometimes, the step of adding material leaves a void in at least one place between the mold and the circumference of the tire or tire tread, allowing the added material to flow into this void during the molding process.

The method may further comprise the step of providing a core rotation spindle assembly to which the portable mold core is attached during the weighing step. In some cases, the core rotation spindle assembly includes a multi-sensor piezoelectric load plate subassembly that is used to weigh the tire tread or tire during the weighing step. In some cases, the method may further include the step of weighing each layer of product as it is laid onto the portable mold core.

In still other embodiments, the method may further comprise the steps of attaching the portable mold core to the core rotation spindle before laying down layers of products to form the tire tread or tire, moving the core and spindle to various tire building stations and detaching the portable mold core and the tire tread or tire that has been built thereon from the spindle and placing the portable mold core and tire tread or tire into a mold.

Sometimes this method further includes the step of preheating the mold core, taring the spindle assembly before the mold core is attached thereto for building the tire or tread and weighing the mold core itself. It may also include the steps of removing the mold core after the tire or tread has been built on the mold core and compensating for temperature drift of the spindle assembly. The step of compensating for temperature drift of the spindle assembly may occur either before or after the tire or tread have been removed from the spindle assembly. After this, the method may further include the steps of weighing the mold core and tire tread together as an assembly and calculating how much material is needed to be added to the tire tread to reach the target weight by subtracting the weight of the mold core by itself.

In some cases where the target weight for the tire or tread has not been reached, the method may further comprise the steps of adding more material to the tread or tire; compensating for the temperature drift of the spindle assembly; removing the mold core and tire or tread from the spindle assembly; recording the negative weight of the mold core and tire or tread; and calculating the weight of the tread or tire by taking the negative value of the weight of the mold core and tire or tread just measured and subtracting the weight of the mold core itself.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Figure 1:
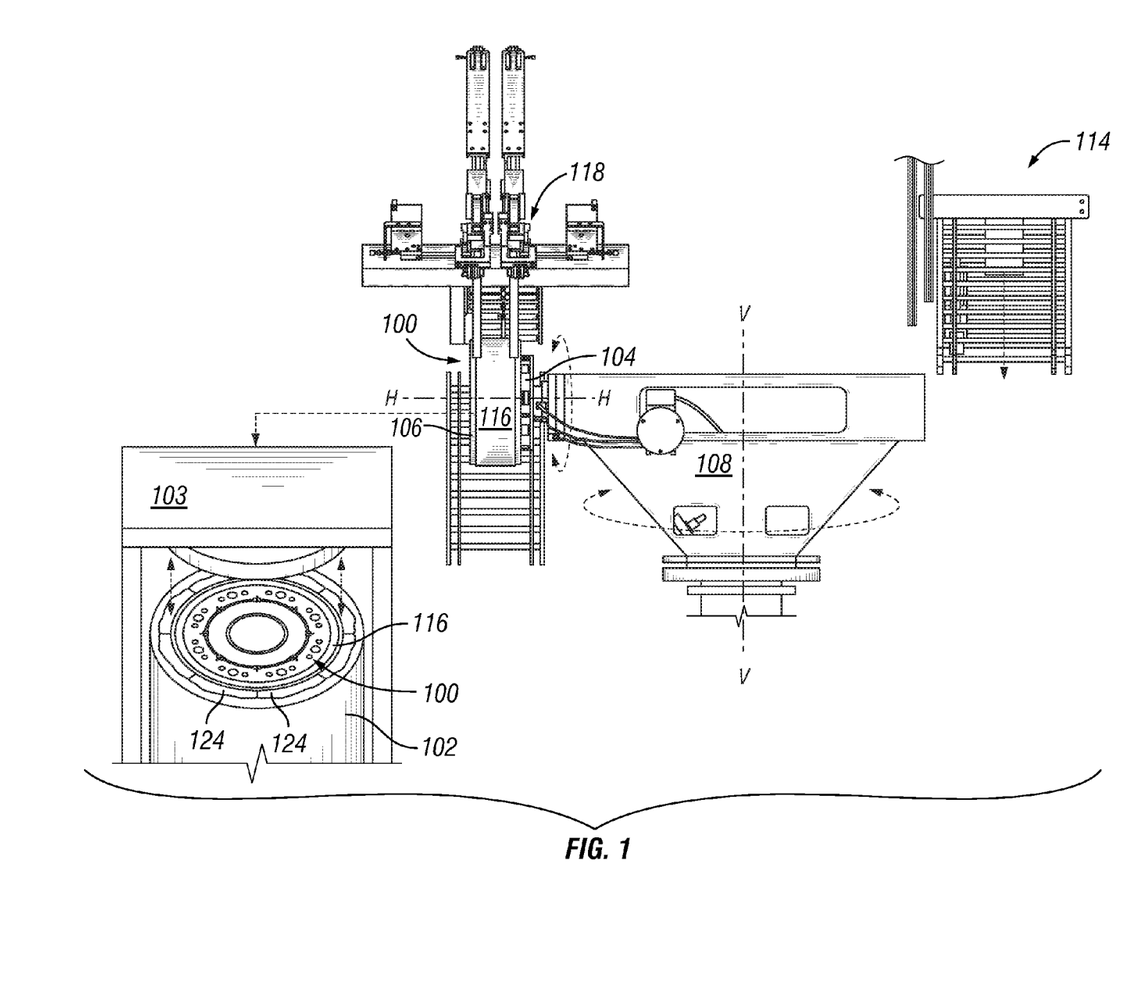
FIG. 1 is an environmental view showing the portable mold core, tire building stations and core rotation spindle assembly of the present invention with the portable mold core and tread shown in a first position where they are attached to the spindle assembly for adding more rubber to the tread and in a second position where they have been inserted into a mold.

Looking at FIG. 1, an apparatus for building a tire tread that has a shear band comprising a shear layer that is sandwiched by two inextensible membranes, as exemplified in U.S. Pat. Nos. 6,769,465; 7,013,939 and 7,201,194; is shown. Specifically, this apparatus includes a portable molding core 100 that is readily attachable and detachable to other tire building equipment such as a mold 102 that is found in a molding press 103, core rotation spindle assembly 104 that is part of an indexer 108, and a cooling station (not shown). The portable molding core 100 comprises a cylinder with a circumferential surface 106 upon which components of the tire or tread 116 are laid by the tire building station 114 or material compensation station 118 as the mold core 100 is rotated by the spindle assembly 104 about its horizontal axis H-H. The mold core 100 and tread 116 are rotated by the indexer 108 about its vertical axis V-V at the appropriate time so that they are located before the desired building station 114, 118. The molding core 100 also has means for heating and cooling the cylinder such as cartridge heaters and/or heating and cooling circuits through which heating and cooling media can be passed for transferring heat to and from the mold core 100.

Figure 2:
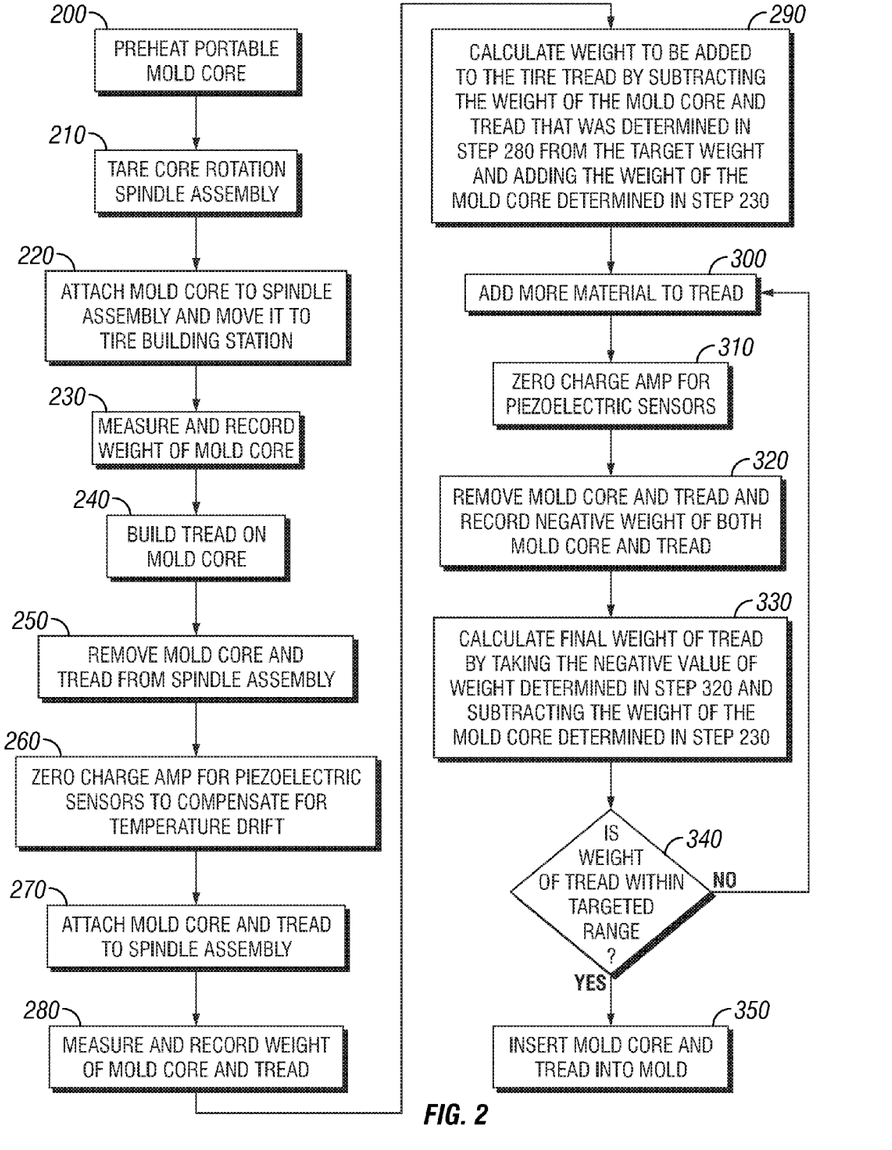
FIG. 2 is a flow chart showing the steps of a method according to the present invention including the steps of taring the core rotation spindle assembly, compensating for the temperature drift of the spindle assembly, and weighing the portable mold core and tire tread.

In the beginning of the tire tread building process, which is depicted by the steps shown in FIG. 2, this mold core 100 may be preheated, which corresponds to step 200 of the flowchart. This may be accomplished either by relying on the residual heat stored in the mold core subsequent to a molding cycle that has occurred in the mold or by heating it using a preheating station or magazine (not shown) that supplies electrical power to the cartridge heaters of the mold core 100. This step aids in the tread building process by increasing the tack between various tire components that are laid onto the mold core and the mold core itself, helping to keep these components in place during the tire building process. Furthermore, the heating of the core adds heat to the tread during the building process, which reduces the curing time necessary in the mold later on, which improves the overall productivity of the tire building process.

Figure 3:
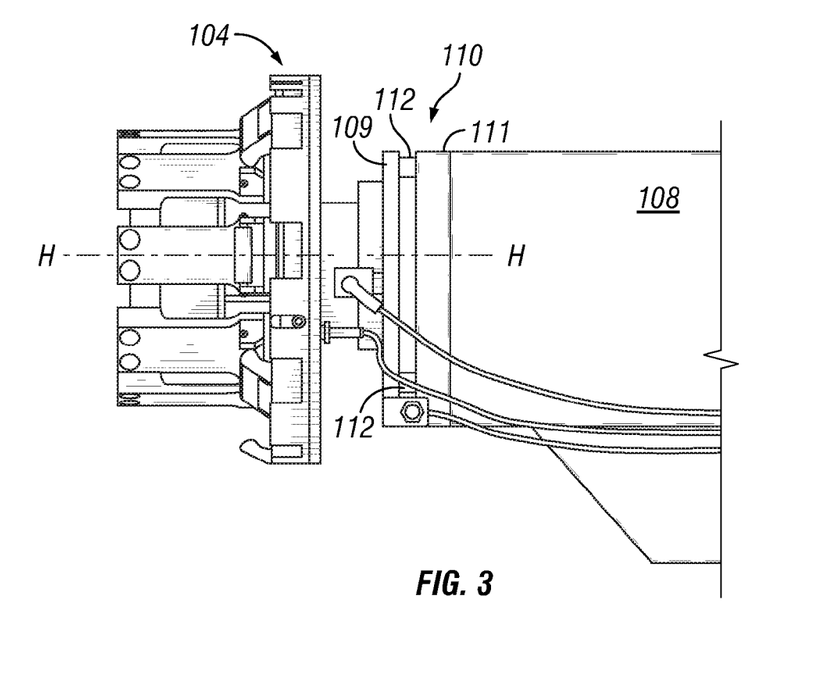
FIG. 3 is front view of the core rotation spindle assembly of the present invention with the four sensor piezoelectric load plate subassembly shown with the portable mold core removed for clarity.

However, preheating the mold core 100 presents some challenges concerning measuring the weight of the tire tread itself due to the heat transfer from the mold core 100 to the spindle assembly 104 which induces some stress on the sensors used in the spindle assembly 104 to measure weight, therefore particular steps must be taken to tare and weigh the spindle assembly 104, mold core 100 and tire tread, which are described hereafter to prevent erroneous measurements from being taken (see FIG. 2 for a flow chart showing these steps). As can be imagined, this problem is exacerbated by the amount of precision such as +/−0.1% with which the weight of a tire or tread must be measured to fit snugly within a mold cavity. Just before the preheated mold core is attached to the spindle assembly 104, this assembly, which is attached to the indexer 108 via a four sensor piezoelectric load plate subassembly 110 (see FIG. 3) is readied to receive the mold core 100 by first adjusting the charge amp of the sensors 112 to an output of zero. For this embodiment, the sensors used are commercially available pressure transducers that are sold by KISTLER under model no. 9146B and are loaded in shear between a front plate 109 and a rear plate 111 that are attached to the rear of the spindle assembly 104. These sensors have a crystal in them, which is sensitive to loads that are applied to it so that it produces a charge as a result of any force exerted on it. Dimensional changes and shifts of the rear and front plates 109, 111 that are caused by weight or temperature drift; therefore, affect the output of these sensors such that temperature drift of the spindle assembly and load plate subassembly may compromise the accuracy of any weight measurement made by the sensors.

The taring step corresponds to step 210 of the flow chart. This compensates for the weight of the spindle assembly 104 itself so that no error is introduced when weighing the tire tread later on. Then the mold core 100 is attached to the core rotation spindle assembly 104 by means commonly known in the art and is then positioned by the rotation of the indexer 108 about a vertical axis V-V such that the mold core 100 is immediately in front of the tire building station 114, which is the equipment that lays the tire components upon the circumference 106 of the mold core 100 as it rotates. This step is represented by step 220 in the flow chart. Next, the weight of the mold core 100 by itself is measured and recorded as represented by step 230.

Figure 4:
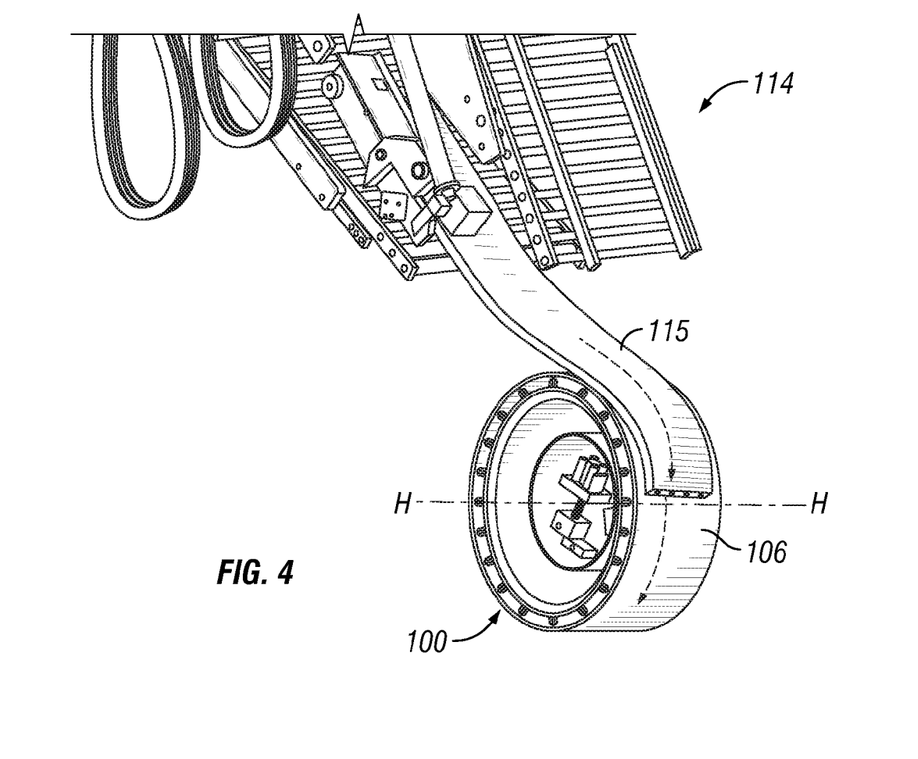
FIG. 4 is a perspective view of the tire tread being built on the portable mold core with the spindle assembly and indexer removed for enhanced clarity.

For this embodiment, this equipment 114 lays down the rubber and steel cords that form an inextensible membrane 115, which is part of the shear band of the tread as shown by FIG. 4. After the shear band has been built on the mold core 100 (step 240), the indexer 108 rotates the core and tread so that they are in front of the material compensation station 118 where the tread rubber is laid down. Then the mold core 100 and the tread 116 are removed from the spindle assembly 104 (step 250). Once again, the charge amp for the sensors 112 is adjusted to zero (step 260). This is done to compensate for the heat transfer that has occurred from the mold core 100 to the spindle assembly 104 during the building of the tread 116 onto the mold core 100 as this causes additional stress due to dimensional changes of the plates 109, 111 to be imposed onto the sensors 112 in addition to the weight of the mold core 100 and tread 116, creating offset drift when trying to weigh these components. After the charge amp has been zeroed once more, the mold core 100 and tread 116 are placed back onto the spindle assembly 104 (step 270) at the material compensation station 118 when the weight of the mold core 100 and tread 116 are weighed and recorded (step 280).

Then, the amount of weight to be added to the tread, $W_{additional}$, is calculated to get it within the targeted weight range, $W_{target}$, which corresponds to an acceptable volume of product which will fit snugly within the mold 100. This is done by subtracting the weight of the tread 116 and solid core 100, $W_{tread+core}$, which have been just weighed together, from the target weight, $W_{target}$, and adding back the weight of the mold core 100, $W_{core}$ which was measured initially by itself in step 230. This calculation, which corresponds to step 290 of the flow chart, is represented by the following equation: $W_{additional} = W_{target} - W_{tread+core} + W_{core}$. For this embodiment, the targeted mass ranges from 58.3 to 59.4 Kg which is equivalent to a weight range of 571-582.12 N and 100-100.3% of the volume of the mold cavity. If the weight of the tire tread is within this range, then the tire tread is ready to be inserted into the mold. However, this is rarely the case as the initial building of the tread is intentionally built to be within 99.1 and 100% of the targeted mass so that the volume of the tread is not larger than the mold can accommodate.

Alternatively, steps 250 and 270 of detaching and attaching the mold core 100 and tread 116 to the spindle assembly 104 may be delayed so both occur after step 260 which is the step of compensating for temperature drift in the spindle assembly 104 by zeroing the charge amp for the sensors 112. In this case, step 260 happens first and then the mold core 100 and tread 116 are removed and the weight of the tread and core having a negative value, $-W_{tread+core}$, is measured and recorded. Then the weight to be added to the tread, $W_{additional}$, is calculated by adding the negative weight of the tread and core to the target weight, $W_{target}$, and adding the weight of the core, $W_{core}$. This calculation is represented by the following equation: $W_{additional} = W_{target} + (-W_{tread+core}) + W_{core}$. Assuming that the weight of the tread 116 is not within the targeted range, the mold core 100 and tread 116 are reattached to the spindle assembly 104.

In such a case, more tread rubber must be added to the tire tread 116 (step 300). The amount of additional rubber that needs to be added is the weight that has just been calculated, $W_{additional}$. The indexer 108 rotates, positioning the mold core 100 and tread 116 so that they are located in front of the material compensation station 118, which is the equipment that adds the additional rubber onto the surface of the tread 116 that is compatible with the tread rubber. This station 118 adds the rubber in increments so that the desired volume and mass of the tread 116 can be built slowly without overshooting these targets. The amount of rubber necessary to be added is calculated based on $W_{additional}$ in conjunction with the density of the tread rubber.

Figure 5:
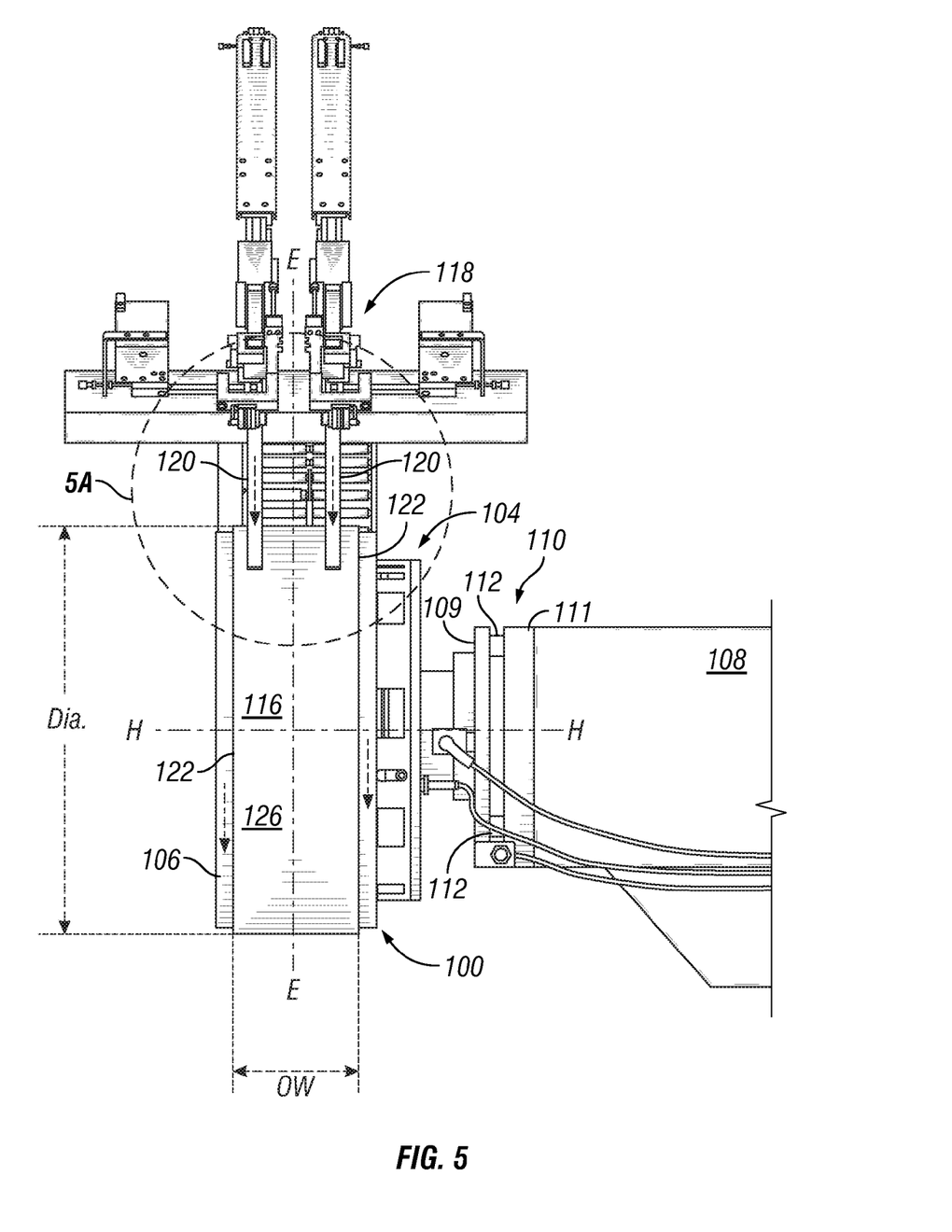
FIG. 5 is a front view of the portable mold core and tire tread showing additional rubber being added to the tire tread in the form of two elongated strips of rubber that are wound about the circumference of the tire tread.
Figure 5A:
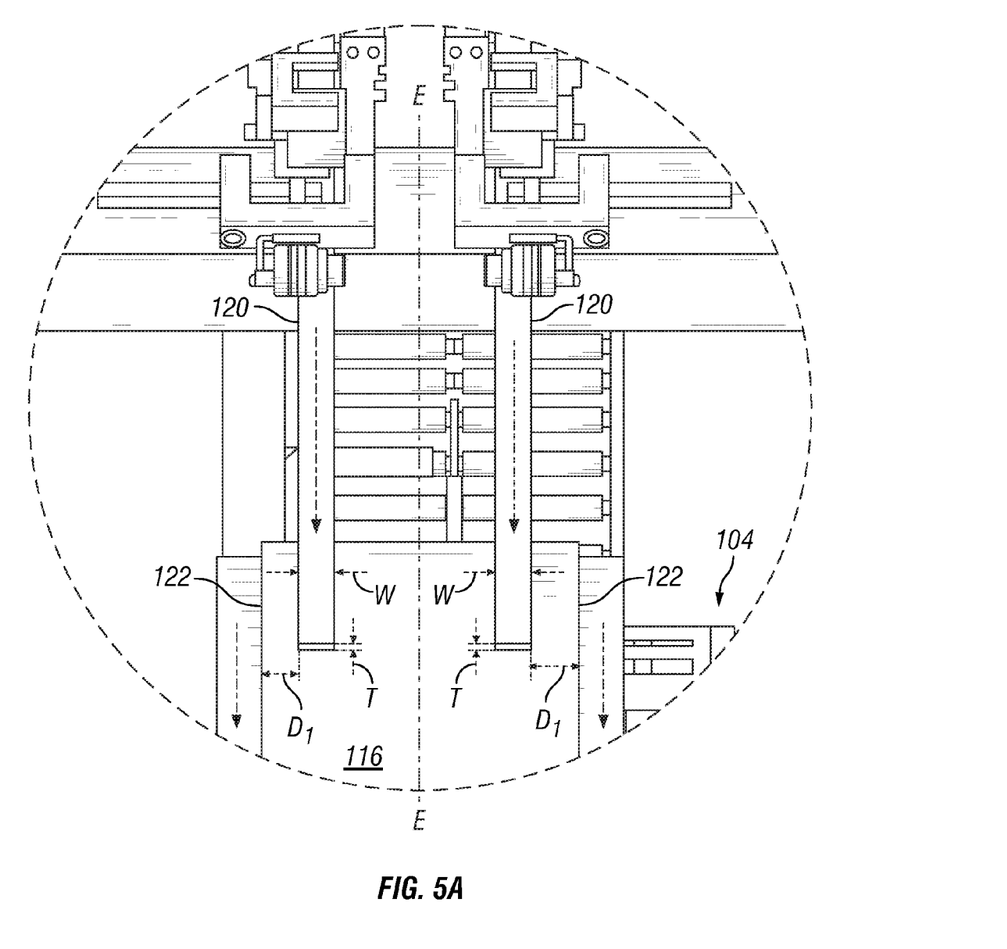
FIG. 5A is an enlarged view taken from FIG. 5 to more clearly show the application of the rubber strips onto the tread.

For this embodiment of the invention as shown by FIGS. 5 and 5A, this station 118 adds two strips 120 of thin rubber that are spaced $D_1$ from a side surface 122 of the tread 116 and are evenly spaced from the equatorial plane E-E of the tread 116, which is the plane that splits the tread 116 in half and that is perpendicular to the axis of rotation H-H of the spindle assembly 104. This distance $D_1$ is 75 mm but may have other values that will allow a complete tread profile to be created in the molding process as will be described later. Also, the tread 116 has an overall width, OW, which is 315 mm for this embodiment of the tread 116 but could be altered depending on the application. The strips 120 of rubber have a thickness T and a width W, which are approximately 2 mm and 30-40 mm respectively for this embodiment but may have other values that allow a complete tread profile to be created during the molding process. These strips 120 are wound about the circumference 126 of the tire tread 116, which has a diameter, Dia, which is 825 mm for this embodiment but could be altered depending on the application. In some situations, the rate at which the strips 120 are applied to the tire or tread and the rate the spindle assembly 104 rotates are different, causing the strips 120 to be stretched, thereby adjusting the amount of weight being added to the tire or tread.

After the additional strips of rubber have been added, the charge amp for the sensors 112 is zeroed once more (step 310) to compensate for further temperature drift of the spindle assembly 104. The mold core 100 and tire tread 116 are then removed from the spindle assembly 104 and a negative weight measurement of the mold core and tire tread after the compensation, $-W_{adj(tread+core)}$, is recorded (step 320). The final weight of the tread, $W_{final}$, is calculated during step 330 by taking the negative value of this negative measurement and subtracting the weight of the mold core itself $W_{core}$ (as calculated during step 230). This calculation is represented by the following equation: $W_{final} = -(-W_{adj(tread+core)}) - W_{core}$. The weight of the tread is checked again (step 340). If the tire tread is still too small, the steps of adding more rubber at the material compensation station 118 and calculating the final tread weight are repeated until the target weight is reached.

Figure 6:
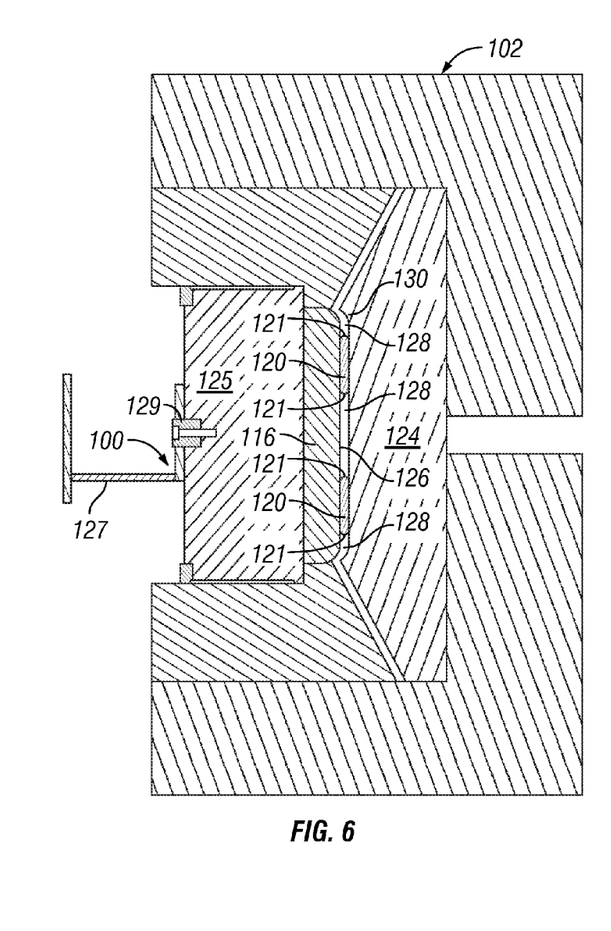
FIG. 6 is partial cross-sectional view of the portable mold core and tire tread with added rubber that has been placed into a mold with small gaps found between portions of the tread and interior surfaces of the mold as the mold closes and the mold sectors move inward toward the circumferential surface of the tread.
Figure 7:
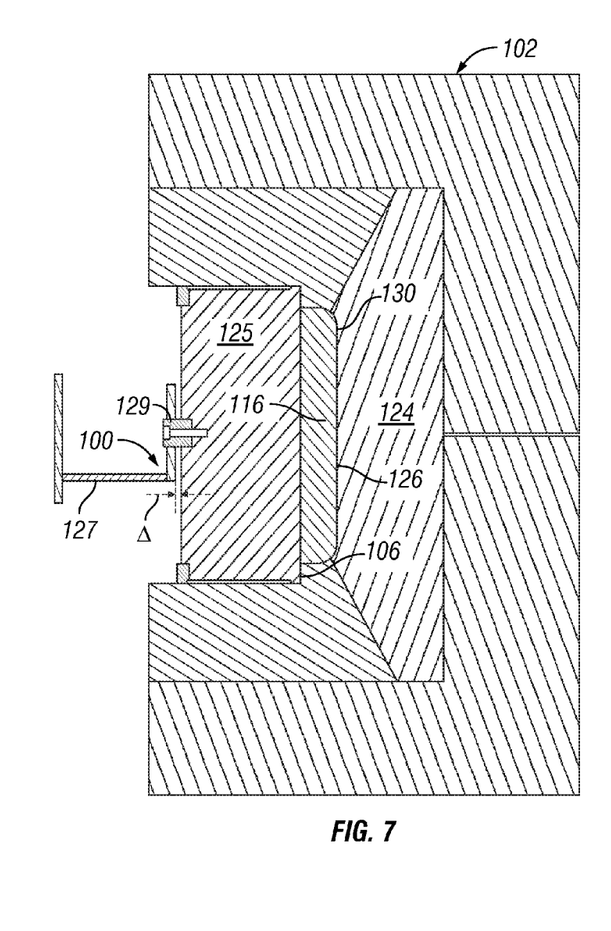
FIG. 7 is a partial cross-sectional view of the portable mold core, tire tread and mold of FIG. 6 showing the completely filled mold cavity due to the flowing of the added rubber during the molding process after the mold has been completely closed.

Once the tire tread has been weighed and its weight is within the targeted range, the tire tread 116 and mold core 100 are placed into the mold 102 (step 350) by robotic or conveyor means. The mold 102 has movable sectors or side actions 124 that create the relief of the sculpture of the tread. They move in as the mold 102 vertically closes. Both movements occur by means commonly known in the art causing the sectors 124 to impinge upon the circumferential surface 126 of the tread to form the relief of the sculpture. As mentioned previously, the added strips 120 of rubber make the tire slightly larger than the cavity of the mold in certain areas, which necessarily means that these strips 120 of rubber are compressed as the sectors 124 of the mold 102 move in as the mold closes as shown by FIG. 6. This creates voids 128 between the tire tread 116 and the interior surfaces 130 of the mold 102 in other areas. The compression of the mold sectors 124 against the added strips 120 of rubber causes the sides 121 of the strips 120 of rubber to bulge and expand. As a result, some flashing can occur into the seams found between the individual mold sectors 124 as these strips 120 expand. Then, as heat and pressure are conveyed to the tire tread 116 by the mold 102 and the portable mold core 100, the added strips 120 of rubber will flow into the voids 128 found between the tire tread 116 and the interior surfaces 130 of the mold 102, thereby creating a tire tread 116 that has completely filled the cavity of the mold 102 as shown by FIG. 7, which in turn results in a complete sculpture of the tire tread 116 once the molding process is completed.

It should be noted that the mold 102 does not have an inflatable bladder that is commonly used in tire molds. Instead, the portable mold core 100, which has an outer ring 125 that is connected to an inner ring 127 by pins 129 that allow the outer ring to expand and contract with changes in temperature, is seated onto the exposed surface of the mold 102 and centered therewith. In addition, the mold core 100 has heating cartridges that connect to the mold 102 and receive power from the mold 102, causing the mold core 100 to heat up. This in turn causes the outer ring 125 of the mold core 100 to expand by an amount $\Delta$ (see FIG. 7) and supply the necessary pressure and heat to the tire tread 116 as it is compressed between the interior surfaces 130 of the mold 102 and the circumferential surface 106 of the mold core 100. For this particular embodiment, $\Delta$ can range from 0.8-2.5 mm to provide the necessary compression so that the tread 116 can be properly vulcanized and so that any trapped air or gas bubbles found within it can escape.

Once the tread has been in the mold long enough for vulcanization to have occurred, the mold is opened and the portable mold core and the tire tread are moved to a cooling station or extraction station where the mold core is placed on an exposed surface of the cooling station (not shown). At this time, the mold core is quickly cooled until it begins to shrink while the diameter of the tread band remains substantially the same as the steel in shear band resists dimensional change. Consequently, a gap is created between the tread band and the portable mold core. The tread is then removed from the mold core by a stripper ring found on the cooling station, which raises the tread until the tread is found above the mold core.

For this embodiment, the tread is now ready to have spokes added to the tread for connecting the tire as a whole to the rim of a vehicle. This is done by placing the tread into another mold (not shown) where the spokes are formed by pouring polyurethane into the mold. Once the spokes of the tire are cured and attached to the tread, the tire as a whole is ready for use. At about the same time, the mold core is either reattached to the spindle assembly in order to build another tread thereon or is connected to a preheating station or magazine as previously described. Thus, the tire building process is begun once more.

While only a tread that is formed with spokes that is part of a non-pnuematic tire has been specifically described herein, it is contemplated that this process could be used with tires that have other means for connecting the tread to the rim of vehicle including those that have more conventional sidewalls and/or bead sections. Accordingly, these other types of tires fall within the scope of the present invention.

While this invention has been described with reference to particular embodiments thereof, it shall be understood that such description is by way of illustration and not by way of limitation. For example, some of the equipment may be constructed and function differently than what has been described herein and certain steps of the method may be omitted and/or performed in an order that is different than what has been specifically mentioned. Accordingly, the scope and content of the invention are to be defined only by the terms of the appended claims.

What is claimed:

1. A method for controlling the volume of a product that is to be placed in a mold comprising:
   providing a mold and a portable mold core;
   providing a core rotation spindle assembly to which the portable mold core is attached during a weighing step, wherein the core rotation spindle assembly includes a sensor subassembly that is used to weigh the tire tread or tire during the weighing step;

attaching the portable mold core to the core rotation spindle before laying down layers of products to form the tire tread or tire, moving the core and spindle to various tire building stations;

laying one or more layers of products on the portable mold core to form a tire tread or tire;

weighing the tire tread or tire by taring the core rotation spindle, detaching the core rotation spindle from the portable mold core and determining the weight of the tire tread or tire; and attaching the core rotation spindle to the portable mold core when the weight of the tire tread or tire is below acceptable parameters; and placing the tire tread or tire and portable mold core into the mold when the weight of the tire tread or tire is within acceptable parameters.

2. The method of claim 1, which further comprises adding material to the tire tread or tire when after weighing the tire tread or tire the weight of the tire tread or tire is not within acceptable parameters.

3. The method of claim 2, wherein the step of adding material to the tire tread or tire comprises adding a strip of material to the outer circumference of the tire tread or tire that is spaced 75 millimeters away from a side surface of the tread or tire.

4. The method of claim 3, wherein the thickness and width of the strip of material added to the tire or tire tread is 2 millimeters and 30-40 millimeters respectively.

5. The method of claim 4, wherein the strip of material is wound completely around the circumference of the tire tread or tire.

6. The method of claim 2, wherein the step of adding material leaves a void in at least one place between the mold and the circumference of the tire tread or tire, allowing the added material to flow into this void during the molding process.

7. The method of claim 1, wherein an initial tire tread or tire is intentionally built to be less than a targeted mass and volume for the tire tread or tire.

8. The method of claim 1, wherein the sensor subassembly is a multi-sensor piezoelectric load plate subassembly.

9. The method of claim 1, which further comprises preheating the mold core and taring the spindle assembly before the mold core is attached thereto and weighing the mold core once it is attached to the spindle assembly.

10. The method of claim 9, which further comprises removing the mold core after the tire tread or tire has been built thereon and compensating for temperature drift of the spindle assembly, said step of compensating for the temperature drift of the spindle assembly occurring either before or after the mold core and tire tread or tire have been removed from the spindle assembly.

11. The method of claim 10, which further comprises weighing the mold core and the tire tread together as an assembly and calculating how much material is needed to be added to the tire tread-to reach the target weight by subtracting the weight of the mold core and the tire tread assembly from the target weight and adding the weight of the mold core by itself.

12. The method of claim 11, which further comprises adding more material to the tire tread or tire; compensating for the temperature drift of the spindle assembly; removing the mold core and tire tread or tire from the spindle assembly; recording the negative weight of the mold core and tire tread or tire; and calculating the weight of the tire tread or tire by taking the negative of the value of the weight of the mold core and tire tread or tire just measured and subtracting the weight of the mold core by itself.

13. The method of claim 2, wherein the step of adding material includes stretching a strip of material that is added to the tire tread or tire to adjust the amount of weight that is added to the tire tread or tire.

* * * * *